3,258,408
METHOD OF PRODUCING XANTHOSINE

Shinji Okumura, Yokohama-shi, Kanagawa-ken, Teruo Shiro, Kawasaki-shi, Kanagawa-ken, Akio Yamanoi, Tokyo, Shimpachi Konishi, Kawasaki-shi, Kanagawa-ken, and Yoshio Tamagawa and Masahiro Takahashi, Tokyo, Japan, assignors to Ajinomoto Co., Inc., Tokyo, Japan
No Drawing. Filed June 27, 1963, Ser. No. 290,937
Claims priority, application Japan, July 7, 1962, 37/27,815; Apr. 30, 1963, 38/22,160
8 Claims. (Cl. 195—28)

This invention relates to a method of producing xanthosine, and more particularly to a method of producing xanthosine by fermentation.

Xanthosine is one of the biologically important purine nucleosides, and the compound is expected to find increasing use in the fields of medicine and biochemistry. The sodium salt of 5'-xanthylic acid has a pleasant taste and is a useful seasoning agent. Xanthosine is the best known raw material for the synthesis of 5'-xanthylic acid and, therefore, a useful intermediate in the preparation of the sodium salt of the acid.

Known methods of synthesizing xanthosine employ guanylic acid as a starting material. The latter, in turn, is obtained from natural ribonucleic acids by dephosphorylation and is subjected to deamination in a sequence of steps which is complex and costly.

This invention is based on the discovery that certain artificial mutants of *Bacillus subtilis, Escherichia coli, Bacillus megaterium,* and *Pseudomonas perlurida* are capable of producing xanthosine in a culture medium from assimilable carbon and nitrogen sources under aerobic conditions. The xanthosine is recovered from the medium after the microorganisms have been cultured thereon for a sufficient period. The process lends itself to the production of xanthosine on an industrial scale.

*Bacillus subtilis, Escherichia coli, Bacillus megaterium,* and *Pseudomonas perlurida* are not normally capable of producing significant amounts of xanthosine nor of accumulating appreciable amounts thereof in a culture medium. When these microorganisms were exposed to ultraviolet light, X-rays or gamma radiation (cf. Warner Braun "Bacterial Genetics" W. B. Saunder Company, Philadelphia (1957)) or when they were placed in contact with solutions of sodium nitrite either in form of active cells or as spores, the xanthosine producing mutants were formed. They were selected from the unchanged strain by conventional screening techniques and by making use of the fact that the mutants are auxotrophic. The normal or parent strains of the several microorganisms are capable of growth on a conventional Gray-Tatum medium of the type exemplified in Table I, but the mutants do not grow on such a medium.

The mutants grow actively on modified culture media of the type exemplified by the three media listed in Table II which also support growth of the parent strains. The mutants were isolated by conventional screening techniques and individual cultures were grown on the media of Table II. The rate of xanthosine formation in the culture media and the maximum concentration of xanthosine reached was determined, and the strains best capable of producing and accumulating xanthosine were selected. The preferred screening media contain ribonucleic acid or its products of hydrolysis, and ammonium chloride.

TABLE I.—GRAY-TATUM MEDIUM

| | |
|---|---|
| Ammonium chloride _____g__ | 5 |
| Ammonium nitrate _____g__ | 1 |
| Sodium sulfate _____g__ | 2 |
| Magnesium sulfate _____g__ | 0.1 |
| Dipotassium hydrogen phosphate _____g__ | 3 |
| Potassium dihydrogen phosphate _____g__ | 1 |
| Calcium chloride _____g__ | 0.001 |
| Glucose _____g__ | 0.5 |
| Zinc sulfate _____mg__ | 3.3 |
| Ferric chloride _____mg__ | 0.9 |
| Copper sulfate _____mg__ | 0.4 |
| Manganese chloride _____mg__ | 0.07 |
| Water to make one liter. | |

TABLE II.—SCREENING FOR XANTHOSINE PRODUCTION
[pH 7.0]

| | Percent | | |
|---|---|---|---|
| | (A) | (B) | (C) |
| Glucose | 5 | 5 | 5 |
| Ammonium chloride | 1 | 0.6 | 0.6 |
| Potassium dihydrogen phosphate | 0.1 | 0.3 | 0.3 |
| Magnesium sulfate heptahydrate | 0.04 | 0.04 | 0.04 |
| Calcium carbonate | 5 | 5 | 5 |
| Ferrous sulfate | | 0.0005 | 0.0005 |
| Manganese sulfate | | 0.0005 | 0.0005 |
| Diammonium hydrogen phosphate | | | 0.1 |
| Yeast extract | 0.5 | | |
| Dry yeast | | 1 | 1 |
| Urea | | 0.4 | 0.4 |
| Peptone | | 0.5 | 0.5 |

Known methods were employed for determining the xanthosine concentration in the fermentation broths. Paper chromatography, filter paper electrophoresis, and ion exchange resin column chromatography were found most convenient for separating the several components in the media analyzed. The xanthosine fraction was isolated according to its ultraviolet absorption spectrum, and the identification of the isolated dry material was confirmed by conventional comparison tests with known samples of xanthosine.

It is characteristic of many artificial mutants capable of producing and accumulating xanthosine that they require guanine, adenine, or both, in their culture medium, and they can be grown on Gray-Tatum medium modified to contain the necessary purine bases or corresponding derivatives, such as guanosine, adenosine, guanylic acid and adenylic acid. Growth of the microorganisms is stimulated by the presence of amino acids, vitamins and other known growth factors.

Typical artificial mutants of the afore-mentioned microorganisms which produce and accumulate xanthosine in a culture medium are the Strains SX-15 (ATCC No. 15039) and SX-67 (ATCC No. 15040) directly derived from *Bacillus subtilis;* and SX-92 (ATCC No 15041), SX-142 (ATCC No. 15042), SX-993 (ATCC No. 15043) and SX-3-200 (ATCC No. 15044) which are induced from an adenine requiring strain of *Bacillus subtilis.* The strains SX-15 and SX-67 are characterized by their adenine requirement for growth, whereas the four other mentioned mutant strains of *Bacillus subtilis* require guanine and adenine.

A mutant of *Escherichia coli* capable of producing xanthosine by fermentation is the strain E-339 (ATCC No. 15045) which was directly derived from the parent strain, and is characterized by its adenine requirement.

Artificially induced mutants of Bacillus megaterium capable of producing xanthosine in economically useful amounts include the strains MX–503 (ATCC No. 15046) and MX–905 (ATCC No. 15047). A similarly effective mutant strain PX–101 (ATCC No. 15048) was derived from Pseudomonas perlurida. The three mutant strains mentioned last are capable of growing on a Gray-Tatum medium containing guanine, guanosine, guanylic acid, or mixtures of these compounds.

The medium on which the mutant strains of the invention are cultured must contain the usual nutrients required by the microorganisms. Assimilable sources of carbon and nitrogen are required raw materials for the formation of the xanthine nucleus. Carbohydrates as the main carbon source or as a supplemental carbon source provide building blocks for the ribose component of xanthosine. Some of the nutrients are transformed into components of the microorganism cells, and others are consumed to provide the necessary energy.

The preferred carbon sources are assimilable carbohydrates, such as starch, starch hydrolyzates, industrial products rich in sucrose, sugars, polyhydric alcohols and polyhydric acids. Table III shows the variations in the xanthosine produced when the glucose content and/or the pH of medium C of Table II are changed, or when glucose is replaced by other carbon sources. The xanthosine values in grams per liter were obtained with B. megaterium MX–503 and Ps. perlurida PX–1001 under aerobic conditions (20 ml. medium in a 500 ml. shaking flask) at 31° C. in 72 hours.

TABLE III

| Carbon source | B. megaterium MX–503 | | Ps. perlurida PX–1001 | |
| --- | --- | --- | --- | --- |
| | pH | Xanthosine, g./l. | pH | Xanthosine, g./l. |
| 3% glucose | 7.8 | 3.1 | 7.5 | 3.8 |
| 5% glucose | 7.4 | 4.8 | 7.3 | 4.1 |
| 10% glucose | 6.5 | 4.7 | 6.0 | 4.0 |
| 15% glucose | 5.7 | 3.2 | 5.2 | 2.3 |
| 5% fructose | 7.0 | 4.5 | 7.1 | 3.8 |
| 5% maltose | 7.3 | 4.6 | 6.5 | 3.9 |
| 5% sucrose | 7.2 | 4.1 | 7.0 | 3.8 |
| 5% molasses | 7.0 | 3.9 | 7.2 | 4.0 |
| 5% starch (as glucose) | 7.8 | 4.3 | 7.2 | 3.9 |
| 5% starch hydrolysate (as glucose) | 7.5 | 5.0 | 7.8 | 4.5 |
| 3% glucose, 1% mannitol | 7.6 | 4.7 | 7.7 | 4.0 |
| 4.5% glucose, 0.5% tartaric acid | 7.2 | 4.5 | 7.3 | 4.2 |
| 4.5% glucose, 0.5% citric acid | 7.2 | 4.9 | 7.0 | 4.2 |

The mutants of E. coli and B. subtilis are equally capable of metabolizing different carbon sources, as is seen in Table IV. The same conditions were maintained as in the test runs whose results are listed in Table III but using medium A (for E–339) and B (for SX–15) of Table II.

TABLE IV

| Carbon source | E. coli E-339 | | B. subtilis SX-15 | |
| --- | --- | --- | --- | --- |
| | pH | Xanthosine, g./l. | pH | Xanthosine, g./l. |
| 3% glucose | 8.0 | 3.5 | 8.2 | 4.0 |
| 5% glucose | 7.8 | 3.5 | 7.6 | 4.2 |
| 10% glucose | 5.6 | 3.4 | 5.7 | 4.1 |
| 15% glucose | 5.3 | 3.1 | 4.0 | 3.7 |
| 5% fructose | 7.0 | 3.6 | 6.8 | 4.0 |
| 5% maltose | 5.8 | 3.2 | 7.0 | 3.8 |
| 5% sucrose | 5.6 | 2.7 | 7.1 | 3.5 |
| 5% molasses | 6.1 | 2.5 | 6.9 | 3.6 |
| 5% starch (as glucose) | 5.5 | 2.1 | 6.9 | 4.2 |
| 5% starch hydrolysate (as glucose) | 7.0 | 3.0 | 7.4 | 4.4 |
| 3% glucose, 1% mannitol | 7.5 | 3.1 | 7.8 | 3.9 |
| 4.5% glucose, 0.5% tartaric acid | 7.2 | 3.5 | 7.0 | 3.8 |
| 4.5% glucose, 0.5% citric acid | 7.1 | 3.7 | 6.7 | 3.9 |

As shown in Tables III and IV with respect to glucose, highest yields are obtained at an initial carbohydrate concentration of about 5 percent but good results are available at carbon source concentrations between about 3 and 15 percent, and this range is not overly critical.

The source of assimilable nitrogen required for xanthosine production according to the method of the invention may be an inorganic or organic ammonium salt which yields ammonium ions in the aqueous fermentation medium, a nitrate, urea, ammonia supplied as an aqueous solution or gaseous ammonia admixed to the air of aeration in a known manner. The nitrogen of proteins or amino acids also is assimilated by the microorganisms. The amount of nitrogen bearing material is normally smaller than that of the carbon source material.

Certain inorganic salts in small amounts, totaling usually betwen 0.2. and 1.0 percent of the culture medium, are necessary for the fermentation. They should form phosphate, sulfate, potassium, sodium, magnesium, ferrous or ferric, and manganous ions.

The more complex organic materials which enhance the growth of the microorganisms and accelerate the production of xanthosine are important for making the process economically feasible, but need be present only in very small amounts. Their presence affects the xanthosine yield, the maximum xanthosine concentration in the medium, and the rate of xanthosine production. The nutrients or growth accelerating agents of this group include guanine, adenine, guanosine, adenosine, guanylic acid, adenylic acid, amino acids, various vitamins, materials which contain these materials or are transformed into them under fermentation conditions, and other known growth promoting agents.

Readily and inexpensively available sources of organic growth promoting agents of the invention are dry yeast, yeast extracts, corn steep liquor, meat extracts, bouillon, peptones, mixed amino acids obtained by complete protein hydrolysis, extracts obtained from microorganisms, ground microorganism cells, casein hydrolysates, and miscellaneous waste products of the food processing industries which will readily suggest themselves to those skilled in the art. The amount of growth accelerating agents in the nutrient medium is generally not higher than two percent.

The hydrogen ion concentration in the fermentation medium affects the xanthosine yield. Good results were obtained between pH values of 5.0 and 8.5, and a narrower optimum range is readily determined for each mutant strain and specific culture conditions. The influence of pH on xanthosine production in cultures of E. coli E–339, B. subtilis SX–15, B. megaterium MX–503, and Ps. perlurida PX–1001 is illustrated by Table V which lists results obtained with cultures grown on medium (for E–339 and SX–15) and medium C (for MX–503 and PX–1001) of Table II for 72 hours at 31° C. 3 liters of the medium were contained in a 5 liters fermentation jar, and were agitated by a stirrer running at 200 r.p.m., while air was passed through the broth at the rate of 750 milliliters per minute. The indicated pH values were obtained by additions of phosphoric acid, ammonia, KOH, or NaOH.

TABLE V

| pH | Xanthosine produced (grams per liter) | | | |
| --- | --- | --- | --- | --- |
| | E. coli E-339 | B. subt. SX-15 | B. megat. MX-503 | Ps. perlur. PX-1001 |
| 4.5–4.8 | 2.0 | 1.5 | 1.7 | 1.1 |
| 5.0–5.4 | 3.2 | 3.4 | 4.1 | 2.7 |
| 6.0–6.6 | 4.0 | 4.1 | 4.5 | 3.2 |
| 7.0–7.3 | 4.0 | 5.3 | 4.7 | 3.9 |
| 7.5–7.8 | 4.1 | 5.2 | 4.8 | 3.9 |
| 8.0–8.2 | 3.6 | 5.4 | 4.3 | 4.1 |
| 8.5–9.0 | 1.9 | 2.6 | 1.2 | 1.8 |

Useful results are not usually obtained outside the temperature range between 20° C. and 50° C., and temperatures between 30° C. and 37 C. are preferred. The influence of the temperature of the xanthosine yield obtained in the culture medium (for E–339 and SX–15) and medium C (for MX–503 and PX–1001) of Table II with four representative mutant strains of the invention is shown in Table VI. The xanthosine concentration values listed were obtained in 20 milliliters of medium culture under shaking in a 500 ml. flask for 72 hours.

TABLE VI

| Temperature, °C. | Xanthosine produced (grams per liter) | | | |
| --- | --- | --- | --- | --- |
| | E. coli E. 339 | B. subt. SX-15 | B. megat. MX-503 | Ps. perlur. PX-1001 |
| 25 | 2.9 | 4.2 | 3.8 | 4.0 |
| 30 | 3.5 | 5.1 | 4.0 | 4.2 |
| 34 | 3.8 | 5.3 | 5.1 | 3.9 |
| 37 | 3.7 | 4.5 | 3.4 | 2.4 |
| 40 | 2.1 | 2.6 | 2.0 | 1.3 |

The mutant strains of the invention are cultured under aerobic conditions, and air is admixed to the medium either by shaking or by aeration and agitation. The most favorable fermentation period is normally between one day and four days. Seed cultures are prepared on bouillon-agar media, on liquid bouillon, or on one of the fermentation media.

When a good mutant strain is cultured on a suitable fermentation medium under optimum conditions, the ultimate concentration of xanthosine in the medium may be raised to 6 grams per liter. The xanthosine is recovered from the broth by selective adsorption on ion exchange resins or on activated charcoal, and xanthosine in purified form is readily desorbed by eluants.

The following examples are further illustrative of this invention, but it will be understood that the invention is not limited thereto.

*Example 1*

An aqueous culture medium was prepared having the following composition in grams per deciliter:

| | |
| --- | --- |
| Glucose | 5 |
| Potassium dihydrogen phosphate | 0.2 |
| Magnesium sulfate heptahydrate | 0.04 |
| Ferrous sulfate | 0.0005 |
| Manganese sulfate | 0.0005 |
| Dry yeast | 1 |
| Ammonium chloride | 0.4 |
| Urea | 0.6 |
| Amino acid powder | 0.3 |
| Peptone | 0.3 |

The pH was adjusted to 7.0. The analysis of the amino acid powder yielded the following results:

| | Percent |
| --- | --- |
| L-alanine | 12.27 |
| L-cystine | 0.54 |
| L-arginine | 5.86 |
| L-glutamic acid | 7.39 |
| L-aspartic acid | 13.94 |
| Glycine | 6.35 |
| L-histidine | 2.50 |
| L-proline | 7.49 |
| L-isoleucine | 5.09 |
| L-serine | 11.28 |
| L-lysine | 7.15 |
| L-threonine | 5.29 |
| L-leucine | 8.95 |
| L-thyrosine | 0.65 |
| L-methionine | 0.70 |
| L-valine | 6.35 |
| L-phenylalanine | 1.21 |

20 milliliter batches of the aqueous solution obtained were sterilized in 500 ml. flasks at 115° C. for 10 minutes and 0.4 gram of separately sterilized calcium carbonate were added to each flask.

The medium in each flask was inoculated with the B. subtilis mutant strain SX-15.

*Bacillus subtilis* SX-15, the parent strain—*Bacillus subtilis* B-2093
X-ray (1,000 γ/min.) radiated 144 minutes.
Screening test—at the standard penicillin 5,000 μ/ml.
guanosine-nutrient requiring mutant.

Fermentation was permitted to proceed at 30° C. for 65 hours under shaking. The fermented medium then contained 5.7 grams xanthosine per liter. The combined media were centrifuged to remove the microbial cells and calcium carbonate. The clear solution obtained was adjusted to pH 9.5, and passed through a column of Dowex 1 x 4 in the formate form. The anion exchange resin had a grain size of 200 to 400 mesh, and a volume of 200 ml.

Soluble material was removed from the column by washing with 3 liters water, and the xanthosine was eluted with 0.02 molar aqueous formic acid solution. The formic acid was removed from the eluate by evaporation to dryness. The crystalline residue consisted of xanthosine and weighed 5.1 grams per liter of fermentation broth processed.

*Example 2*

An aqueous solution was prepared having the following composition in grams per deciliter:

| | |
| --- | --- |
| Glucose | 6 |
| Potassium dihydrogen phosphate | 0.2 |
| Magnesium sulfate heptahydrate | 0.04 |
| Ferrous sulfate | 0.0005 |
| Manganese sulfate | 0.0005 |
| Ammonium chloride | 0.48 |
| Urea | 0.6 |
| Adenine | 0.030 |
| Guanine | 0.030 |
| Casein hydrolyzate | 0.5 |

3 milliliter batches of the solution having a pH of 7.0 were placed in individual flasks, sterilized at 115° C. for 5 minutes, and mixed with 0.1 gram of separately sterilized calcium carbonate. The media so obtained were inoculated with *B. subtilis* mutant strain SX-67, and the culture was kept at 37° C. for 20 hours under shaking.

The seed cultures produced in this manner were admixed to sterilized 20 ml. batches of the same culture medium in 500 ml. flasks. After fermentation at 37° C. for 55 hours with shaking, the medium contained 2.5 g./l. xanthosine. When the several batches of broth were worked up in the manner of Example 1, 2.1 grams xanthosine were isolated from each liter of medium.

When adenine and guanine are replaced by equivalent amounts of guanosine, adenosine, guanylic acid, and adenylic respectively, closely similar results are obtained.

*Example 3*

*B. subtilis* mutant strain SX-92 was cultured on the medium of Example 1 at 25° C. for 65 hours. At the end of this period, the xanthosine concentration in the culture medium reached 5.4 grams per liter, and 5.0 grams were recovered in the solid state.

*Example 4*

*B. subtilis* mutant strain SX-142 was grown by the method and on the medium described in Example 2, but the fermentation was carried out at 30° C. for 65 hours. The final xanthosine concentration in the medium was 3.4 grams per liter of which 2.9 grams were recovered as described in Example 1.

Example 5

B. subtilis mutant strain SX–993 was cultured on a medium sterilized as described in Example 1, and containing (grams per deciliter):

| | |
|---|---|
| Glucose | 6 |
| Potassium dihydrogen phosphate | 0.2 |
| Magnesium sulfate heptahydrate | 0.04 |
| Ferrous chloride | 0.0004 |
| Manganese chloride | 0.0004 |
| Ammonium chloride | 0.5 |
| Ammonium sulfate | 0.2 |
| Ammonium nitrate | 0.1 |
| Yeast extract | 1 |
| Peptone | 0.3 |
| Calcium carbonate | 2 |

After 65 hours fermentation under shaking at 30° C., the broth was found to contain 3.2 grams xanthosine per liter. 2.8 grams xanthosine were recovered as described in Example 1.

Example 6

B. subtilis strain SX–3–200 was cultured on the medium of Example 5 at 33° C. for 65 hours. The fermentation broth then contained 4.5 g./l. xanthosine of which 4.1 grams were recovered in the solid state.

Example 7

An aqueous solution was prepared to contain

| | Percent |
|---|---|
| Glucose | 5 |
| Potassium dihydrogen phosphate | 0.1 |
| Ammonium chloride | 1.0 |
| Magnesium sulfate heptahydrate | 0.04 |
| Yeast extract | 0.5 | and had a pH of 7.0. 20 milliliter batches of the solution were placed in 500 ml. flasks and steam sterilized at 110° C. for 5 minutes. The media so prepared were inoculated with E. coli mutant strain E–339 which had been cultured on bouillon-agar slants at 31° C. for 24 hours, and one gram calcium carbonate was admixed to each. The fermentation was permitted to proceed at 31° C.

The glucose was almost entirely consumed after 72 hours, and the xanthosine accumulation in the broth had reached 3.5 grams per liter. 3.1 grams were isolated in the manner described in Example 1.

Example 8

An aqueous solution was prepared to contain 3.3% glucose, 0.005% guanine, and 0.002% yeast extract. It had a pH of 6.5. 20 ml. batches of the solution were placed in 500 ml. flasks, and sterilized at 110° C. for two minutes by means of steam. Each batch was mixed with 2 milliliters of a separately prepared sterilized solution containing 10% diammonium hydrogen phosphate, 5% potassium dihydrogen phosphate, and 0.4% magnesium sulfate hepthahydrate, and having a pH of 9.0. The media obtained were inoculated with E. coli strain E–339, and fermentation under shaking took place at 31° C.

The pH dropped below 7.0 after approximately 15 hours, and frequent small additions of potassium hydroxide solution were made as needed to keep the pH of the fermentation broth at about 8.0. Fermentation was terminated after 72 hours. The broth contained 4.2 grams xanthosine per liter. 3.7 grams xanthosine were recovered in the solid state from one liter of the combined broths in the manner described in Example 1.

Example 9

An aqueous solution was prepared to contain the following substances in grams per deciliter:

| | |
|---|---|
| Glucose | 5 |
| Potassium dihydrogen phosphate | 0.25 |
| Magnesium sulfate heptahydrate | 0.05 |
| Ferrous sulfate | 0.0005 |
| Manganese sulfate | 0.0005 |
| Dry yeast | 1 |
| Peptone | 0.5 |
| Urea | 0.5 |
| Ammonium nitrate | 0.5 |

The pH of the solution was 7.0. 20 milliliter batches were sterilized in 500 ml flasks at 115° C. for 10 minutes, and 0.4 gram separately sterilized calcium carbonate were added to each batch. The media so prepared were inoculated with B. megaterium mutant strain MX–503, and fermentation was permitted to proceed at 30° C. with shaking for 65 hours. The medium then contained 3.6 grams xanthosine per liter.

The cells and residual calcium carbonate were separated from one liter of combined fermentation broths, and the clear liquid obtained was adjusted to pH 9.5. It was then passed through a column containing 200 milliliters of the anion exchange resin Dowex 1 x 4 in the formate form and in a particle size of 200 to 400 mesh. The column was washed with three liters water ot remove undesired materials, and the xanthosine was then eluted with 0.02 m. aqueous formic acid solution. The eluate was evaporated to dryness, and yielded a dry residue of 2.7 grams crystalline xanthosine.

Example 10

B. megaterium mutant strain MX–503 was cultured on a medium of the following composition (grams per deciliter):

| | |
|---|---|
| Glucose | 6 |
| Potassium dihydrogen phosphate | 0.1 |
| Magnesium sulfate heptahydrate | 0.04 |
| Ferrous sulfate | 0.0005 |
| Manganese sulfate | 0.0005 |
| Ammonium chloride | 0.8 |
| Urea | 0.3 |
| Ammonium nitrate | 0.3 |
| Ribonucleic acid | 0.15 |
| Casein hydrolyzate | 0.2 |
| Calcium carbonate | 2 | and prepared in the manner described in Example 9. The pH prior to calcium carbonate addition was 5.0. After 72 hours shaking at 34° C., the medium contained 5.1 grams xanthosine per liter. 4.3 grams xanthosine were isolated from one liter of the medium as described in Example 9.

Example 11

An aqueous solution was prepared to contain (grams per deciliter):

| | |
|---|---|
| Starch acid hydrolyzate (glucose equivalent) | 7 |
| Sodium dihydrogen phosphate | 0.1 |
| Magnesium sulfate heptahydrate | 0.04 |
| Ferrous chloride | 0.0004 |
| Manganese chloride | 0.0004 |
| Urea | 0.2 |
| Ammonium chloride | 0.5 |
| Guanine | 0.0025 |
| Caseine hydrolyzate | 0.2 |

20 milliliter batches of the solution which had a pH of 7.0 were sterliized in 500 ml. shaking flasks at 115° C. for 10 minutes, and 0.4 g. calcium carbonate which had been separately sterilized were added to each. The media so prepared were inoculated with B. megaterium mutant strain MX–905, and permitted to ferment with shaking at 37° C. for 60 hours. When fermentation was terminated, the medium contained 4.0 grams xanthosine per liter. 3.4 grams xanthosine were recovered from one liter of the combined media as described in Example 9.

Example 12

An aqueous solution was prepared from (grams per deciliter):

| | |
|---|---|
| Glucose | 5 |
| Potassium dihydrogen phosphate | 0.3 |
| Magnesium sulfate heptahydrate | 0.04 |
| Ferrous sulfate | 0.0006 |
| Manganese sulfate | 0.0005 |
| Yeast extract | 1.0 |
| Peptone | 0.5 |
| Urea | 0.2 |
| Ammonium chloride | 0.6 |

Its pH was 7.2. It was distributed in 20 ml. batches in 500 ml. shaking flasks, sterilized at 115° C. for 10 minutes, and mixed with 0.4 gram sterile calcium carbonate per batch.

Pseudomonas perlurida mutant strain PX-1001 was cultured for 16 hours at 25° C. on a medium of the same composition, and 0.1 ml. of the seed culture obtained were employed to inoculate each of the liquids in the flasks. The flasks were shaken for 80 hours at 25° C. whereupon the medium contained 4.6 grams xanthosine per liter. One liter of the combined fermentation broths was worked up as described in Example 9, and 4.1 grams crystalline xanthosine were isolated.

Example 13

Pseudomonas perlurida mutant strain PX-1001 was cultured in a manner analogous to that of Example 12 on a culture medium containing, in grams per deciliter:

| | |
|---|---|
| Glucose | 5 |
| Potassium dihydrogen phosphate | 0.04 |
| Magnesium sulfate | 0.04 |
| Ferrous chloride | 0.0004 |
| Yeast extract | 0.1 |
| Biotin | 0.2 |
| Corn steep liquor | 0.2 |
| Ammonium sulfate | 1 |

The medium had a pH of 7.0. Fermentation was terminated after 75 hours. The medium contained 3.2 grams xanthosine per liter, and 2.6 grams were isolated from one liter of the combined media in the solid state.

Example 14

An aqueous solution was prepared having the following composition in grams per deciliter:

| | |
|---|---|
| Glucose | 6 |
| Potassium dihydrogen phosphate | 0.2 |
| Magnesium sulfate heptahydrate | 0.04 |
| Ferrous sulfate | 0.0005 |
| Manganese sulfate | 0.0005 |
| Ammonium chloride | 0.1 |
| Casein hydrolyzate, (vitamin free: Difco) | 0.2 |
| Ribonucleic acid | 0.175 |

20 milliliters batches of the aqueous solution obtained were sterilized in 500 ml. flasks at 115° C. The medium in each flask was inoculated with the B. subtilis mutant strain SX-15. Fermentation was permitted to proceed at 30° C., for 65 hours under shaking. As the pH value of the medium fell below 5.0 during culture, concentrated solution of ammonia was directly added to the medium to control and maintain the pH above 5.0 and to supply the nitrogen source. The fermented medium then contained 4.3 grams xanthosine per liter. When the several batches of medium were worked up in the manner of Example 1, 3.1 grams xanthosine were isolated from each liter of medium.

While the invention has been described with particular reference to specific embodiments, it is to be understood that it is not limited thereto, but is to be construed broadly and restricted solely by the scope of the appended claims.

What is claimed is:

1. A method of producing xanthosine, which comprises aerobically culturing an auxotrophic mutant of a microorganism selected from the group consisting of Bacillus subtilis, Escherichia coli, Bacillus megaterium, and Pseudomonas perlurida, said mutant being of a strain selected from the group consisting of strains having respective ATCC numbers 15039, 15040, 15041, 15042, 15043, 15044, 15045, 15046, 15047, and 15048 on an aqueous culture medium including a source of assimilable carbon, a source of assimilable nitrogen, and a source on at least one growth promoting agent selected from the group consisting of guanine and adenine, until xanthosine is accumulated in said medium, and recovering said xanthosine.

2. A method as set forth in claim 1, wherein said medium is held at a temperature substantially between 25° C. and 37° C., and at a pH value between substantially 5.5 and 8.0 during said culturing of said mutant.

3. A method as set forth in claim 2, wherein said carbon source is selected from the group consisting of glucose, fructose, maltose, sucrose, molasses, starch, starch hydrolyzate, mannitol, tartaric acid, and citric acid, and said nitrogen source is selected from the group consisting of ammonium chloride, urea, ammonium sulfate, ammonium nitrate, ammonium phosphate, and ammonia.

4. A method as set forth in claim 3, wherein said medium further includes ions of at least one inorganic salt, said ions being members of the group consisting of potassium, sodium, magnesium, manganese, iron, calcium, phosphate, sulfate, chloride, and carbonate.

5. A method as set forth in claim 1, wherein said microorganism is Bacillus subtilis.

6. A method as set forth in claim 1, wherein said microorganism is Bacillus megaterium.

7. A method as set forth in claim 1, wherein said microorganism is Escherichia coli.

8. A method as set forth in claim 1, wherein said microorganism is Pseudomonas perlurida.

References Cited by the Examiner

UNITED STATES PATENTS

| | | | |
|---|---|---|---|
| 3,085,946 | 4/1963 | Kaudewitz | 195—78 |
| 3,102,079 | 8/1963 | Kinoshita et al. | 195—28 |
| 3,111,459 | 11/1963 | Motazaki et al. | 195—28 |
| 3,118,820 | 1/1964 | Uchida et al. | 195—28 |
| 3,135,666 | 6/1964 | Hara et al. | 195—28 |

OTHER REFERENCES

J. Biol. Chem., by Magasanik et al., vol. 206, pp. 83 to 87 (1954).

A. LOUIS MONACELL, Primary Examiner.

A. E. TANENHOLTZ, Assistant Examiner.